UNITED STATES PATENT OFFICE.

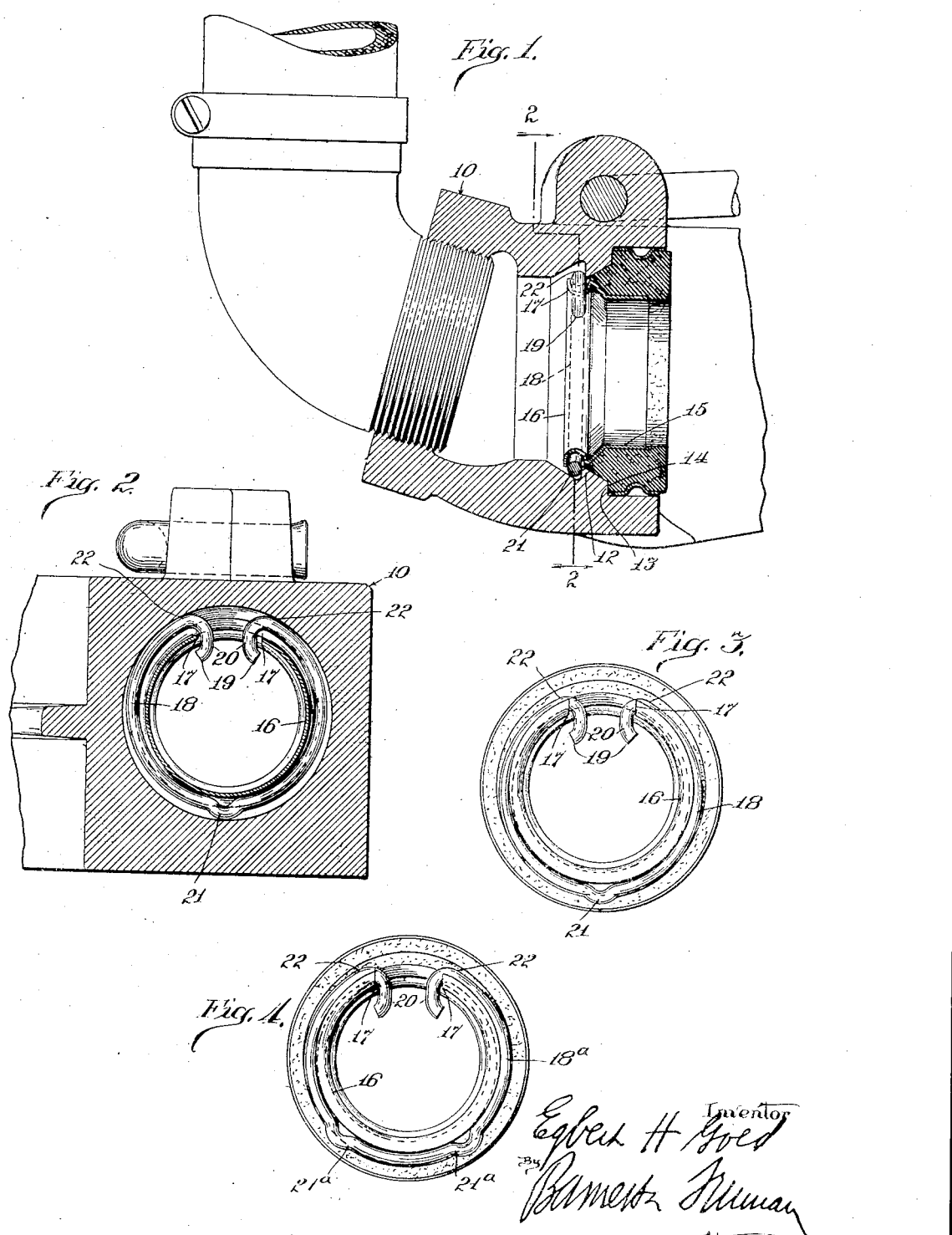

EGBERT H. GOLD, OF CHICAGO, ILLINOIS.

GASKET FOR TRAIN-PIPE COUPLINGS.

1,350,074.

Specification of Letters Patent.

Patented Aug. 17, 1920.

Application filed December 26, 1919. Serial No. 347,364.

*To all whom it may concern:*

Be it known that I, EGBERT H. GOLD, a citizen of the United States, residing at Chicago, in the county of Cook and State of Illinois, have invented certain new and useful Improvements in Gaskets for Train-Pipe Couplings, of which the following is a specification.

My invention relates to a gasket of the type used in connection with railway train pipe couplers and more particularly to the type of gasket adapted to be secured in position by means of an expansion ring which expands into locking engagement with the coupler.

The object of the invention is to provide an improved means for securing the gasket in its operative position in a coupling head which will be simple in its construction, inexpensive to manufacture and which will be more reliable in its operation than the devices now used for the above purpose.

It has been customary to secure gaskets of the general type illustrated in this application, in their operative position by means of a split ring carried by the gasket so that its ends may be forced together to decrease the diameter of the ring when the gasket is applied and released to permit the ring to expand back of a shoulder formed in the conduit of the coupler. One of the objections to an attachment of this character is that the split ring due to displacement or unequal expansion, does not always engage with the said shoulder throughout its entire circumference or at a sufficient number of points to prevent the gasket being blown out of the port by the discharge of the fluid under pressure from the train line when the hose couplings are disconnected. A specific object of this invention is to provide a suitable attaching member which will avoid the above mentioned and other incidental objections to an attaching member of the type above referred to by providing an expansion ring which will insure engagement with the coupler at a plurality of points.

The invention has for other objects the novel arrangements, constructions and combinations of parts and devices hereinafter described and claimed for carrying out the above stated objects and such other objects as will appear from the description of my invention.

The invention is illustrated in certain preferred embodiments in the accompanying drawing wherein:

Figure 1 is a fragmentary view in vertical section of a train pipe hose coupler showing a gasket secured in operative position therein by means of an attaching member made in accordance with my invention.

Fig. 2 is a cross-section through the coupler head showing the expansion ring in its expanded position; this view being taken on line 2—2 of Fig. 1, looking in the direction indicated by the arrows.

Fig. 3 is a view in elevation of the gasket and attaching ring illustrated in Figs. 1 and 2, and Fig. 4 is a view similar to Fig. 3, showing a modified form of attaching ring.

Like characters of reference designate like parts in the several figures of the drawing.

In the drawing I have shown my invention in connection with a conventional form of straight port hose coupler of the gravity type though it will be obvious that the use of the invention is not limited to the particular type of coupler shown. The coupler designated at 10 in the drawing, is formed with a recess 11 in its outer face and with an internal circumferential rib or shoulder 12 providing a seat 13 against which the shoulder 14 of the gasket bears when the coupler 10 is interlocked with a corresponding coupler head. The gasket is preferably provided with an internal sleeve 15 formed at its inner end with a circumferential groove 16. The grooved portion 16 of the sleeve is cut away as indicated at 17 and normally projects beyond the inner edge of the rib 12 when the gasket is applied. An attaching member 18 is confined in the channeled portion of the sleeve and preferably comprises a wire bent to a substantially ring shape with its ends 19—19 spaced apart as indicated at 20 and bent downwardly through the cut-away portion 17 of the sleeve. The wire ring is also bent to provide a radially projecting portion or hump 21 which is preferably disposed substantially diametrically opposite the ends 19—19. The ring normally stands in its expanded position as shown in Figs. 2 and 3 so that the portions 22—22, adjacent the ends 19, 19, and the projecting portion 21 will extend back of the inner edge of the rib 12 so as to lock the gasket in its applied position.

When applying the gasket, the diameter of the ring is reduced by forcing the ends 19—19 together. When the ring is contracted in this manner the projection 21 is preferably the only portion of the ring which projects any appreciable distance beyond the outer edge of the grooved portion 16 of the sleeve 15. This permits the gasket to be fitted into a coupler port having a minimum clearance between the walls of the port and the gasket. When the clearance between the walls of the port and the gasket is limited the application of the gasket may be expedited by rocking the gasket so that the projection 21 will pass over the rib 12 in advance of the other portion of the ring. When the ends 19—19 are released the ring 18 will expand in its position back of the rib 12 thus locking the gasket in position. The distance between the projection 21 and the expanded ends 22—22 will be sufficient to insure contact of the ring with the rib 12 at diametrically opposite points.

The gasket may be readily removed from the coupler port when desired by contracting the wire spring and slightly rocking the gasket so that the side opposite to the projection 21 may be withdrawn from the port in advance of the said projection.

In Fig. 4 I have shown a modified gasket in which the structure is substantially the same as that illustrated in Figs. 1 to 3 inclusive with the exception that the spring clip designated 18ª in this figure is provided with two radially projecting portions 21ª—21ª. The construction and operation of this form of the invention may be otherwise the same as that previously described.

While I have illustrated my invention in two specific embodiments it will be obvious that further modifications might be made without departure from the spirit of my invention. I, therefore, wish it understood that my invention contemplates all such modifications as come within the scope of the appended claims.

I claim:

1. The combination with a coupler head having a port provided with an inward projection, of a gasket adapted to fit into said port adjacent said projection and means for securing the gasket in its operative position comprising a ring adapted to expand into a locking engagement with the coupler in a position back of said projection; said ring being formed with a bend providing an outwardly extending projection which normally fits back of said projection in the coupler port when the gasket is in its operative position.

2. The combination with a coupler head having a port provided with an inwardly projecting rib of a gasket formed with a circumferential groove and adapted to fit in said port, and means for securing the gasket in its operative position comprising a ring in said groove adapted to expand in said locking engagement with said rib and formed with an outwardly extending projection adapted to fit back of said rib when the gasket is in its applied position.

3. The combination with a coupler head having a port provided with a shoulder, of a gasket adapted to fit in said port, and means for securing the gasket in its operative position comprising a wire bent to substantially ring shape and having its ends separated so as to permit the diameter of said ring to be diminished during the application of said gasket; said ring being provided with an outwardly extending projection substantially diametrically opposite the said spaced ends and adapted to fit back of said rib in the coupler port when the gasket is applied.

4. The combination with a train pipe coupler having a port formed with a rib, of a gasket having a circumferential groove, a resilient ring in said groove adapted to be contracted within said groove when the gasket is inserted in said port and when expanded to fit back of said rib, comprising a wire bent to substantially ring shape with its ends spaced apart and formed at a point substantially opposite said ends with an outward projection adapted to project beyond the edge of the groove in the gasket when the ring is contracted.

5. The combination with a train pipe coupler having a port formed with a rib, of a gasket having a circumferential groove, a resilient ring in said groove adapted to be contracted within said groove when the gasket is inserted in said port and when expanded to fit back of said rib, comprising a wire bent to substantially ring-shape with its ends spaced apart and formed at a point substantially opposite said ends with a single outward projection adapted to project beyond the edge of the groove in the gasket when the ring is contracted.

6. The combination with a train pipe coupler having a port formed with its off-set providing a shoulder, of a gasket having a circumferential groove, a resilient ring in said groove adapted to be expanded when the gasket is applied so as to fit back of said shoulder, and a spring element adapted to lock said gasket in its operating position comprising a ring provided with a bend forming an outwardly extending projection adapted to fit back of said shoulder when the gasket is in its applied position.

EGBERT H. GOLD.